United States Patent [19]

Timewell

[11] Patent Number: 4,795,537
[45] Date of Patent: Jan. 3, 1989

[54] ELECTRICAL CONDITIONING SYSTEM FOR ELECTRODES IN AN ELECTROLYSIS CELL

[75] Inventor: Richard R. Timewell, Vancouver, Canada

[73] Assignee: H.P.G. Research Ltd., Vancouver, Canada

[21] Appl. No.: 34,554

[22] Filed: Apr. 10, 1987

[51] Int. Cl.[4] ............................ C25B 1/04; C25F 1/00
[52] U.S. Cl. ................................. 204/129; 204/144.5; 204/228
[58] Field of Search .................... 204/129, 144.5, 147, 204/196, 228, DIG. 9

[56] References Cited

U.S. PATENT DOCUMENTS 3,242,064 3/1966 Byrne ................................ 204/147
3,294,666 12/1966 Wiersma ........................ 204/144.5
3,980,053 9/1976 Horvath ............................. 204/228

Primary Examiner—T. M. Tufariello
Attorney, Agent, or Firm—Graybeal, Jensen & Puntigam

[57] ABSTRACT

Metal electrodes (17,20) defining a cathode and anode are positioned in an electrolyte (28) so as to comprise an electrolysis cell (18). An electrical conditioning circuit (10) includes means for generating a pulsating DC voltage signal, which is connected to the metal electrodes (17,20). Particular characteristics of the pulsating signal, including in particular peak pulse voltage and duty cycle, have selected values such that hydrogen is produced from one electrode (17) and the other electrode (20) is maintained substantially in a state of depassivation, such that any oxide, scale or other inorganic compound pre-existing on the other electrode is removed and further such that the other electrode remains substantially clean.

20 Claims, 4 Drawing Sheets

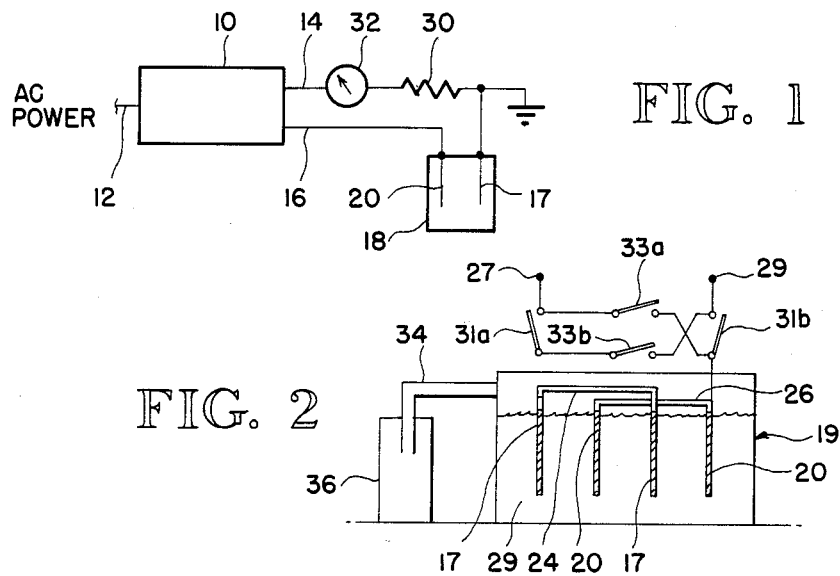
FIG. 1
FIG. 2
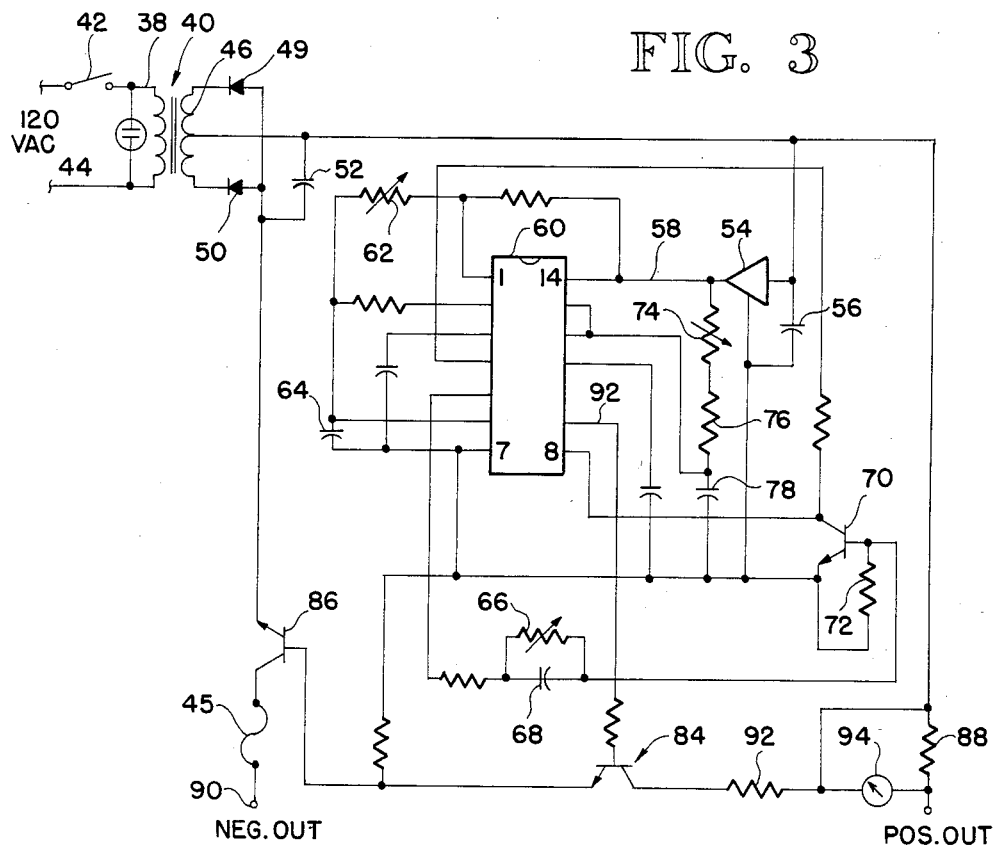
FIG. 3

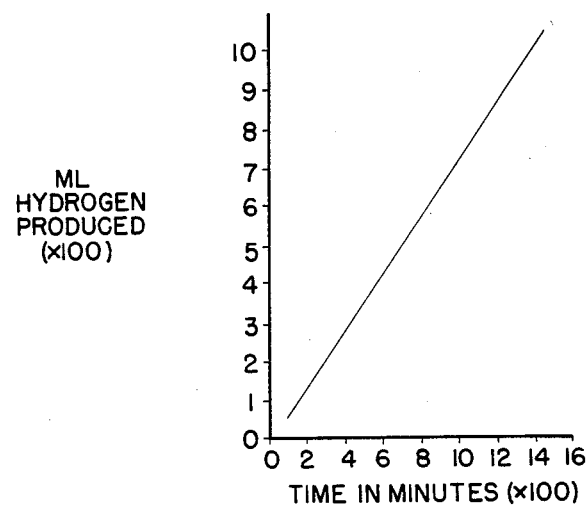
FIG. 4
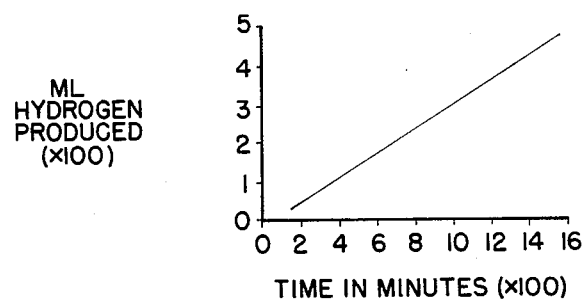
FIG. 5
FIG. 6
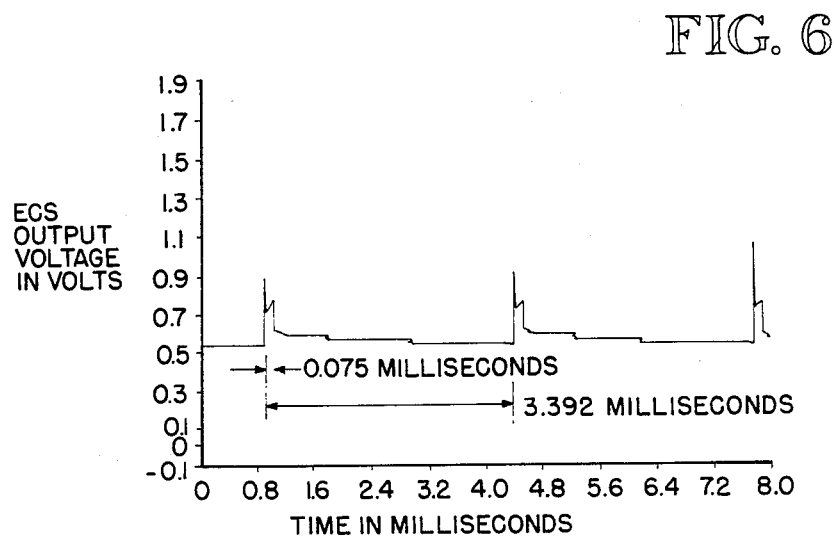

FIG. 10

| ELECTRODE | AVERAGE CURRENT $I_{av}$ (AMPS) | PEAK VOLTAGE $V_{pk}$ (VOLTS) | PEAK CURRENT $I_{pk}$ (AMPS) | DUTY CYCLE D | AVERAGE POWER $P_{av}$ (WATTS) | HYDROGEN PRODUCED (ml) | ENERGY EFFICIENCY EE (%) | CURRENT EFFICIENCY CE (%) | TOTAL ELAPSED TIME (min) |
|---|---|---|---|---|---|---|---|---|---|
| ALUMINUM | 0.0202 | 0.75 | 0.87 | 0.0232 | 0.015 | 16 | 859 | 455 | 25 |
| | 0.0205 | 0.79 | 0.88 | 0.0203 | 0.016 | 45 | 603 | 359 | 85 |
| | 0.0180 | 0.77 | 0.88 | 0.0204 | 0.014 | 114 | 1118 | 612 | 175 |
| | 0.0200 | 0.76 | 0.88 | 0.0230 | 0.015 | 173 | 840 | 460 | 267 |
| | 0.0200 | 0.76 | 0.89 | 0.0224 | 0.015 | 223 | 964 | 520 | 336 |
| STEEL | 0.0484 | 0.974 | 2.30 | 0.021 | 0.047 | 15.6 | 200 | 138 | 33.5 |
| | 0.0484 | 1.000 | 2.30 | 0.021 | 0.018 | 21.6 | 167 | 119 | 48.5 |
| | 0.0480 | 1.010 | 2.28 | 0.021 | 0.018 | 40 | 143 | 103 | 102 |
| | 0.0486 | 1.020 | 2.31 | 0.021 | 0.049 | 53.5 | 200 | 145 | 129.5 |

ELECTRICAL CONDITIONING SYSTEM FOR ELECTRODES IN AN ELECTROLYSIS CELL

DESCRIPTION

1. Technical Field

This invention relates generally to the art of electrolysis, which typically involves the decomposition of an electrolyte by an electrical current, and more particularly concerns a system in which a pulsating DC current is applied to the electrodes in an electrolysis cell.

2. Background Art

In the typical operation of an electrolysis cell, an electric current is produced and hydrogen and oxygen are produced at the negative (cathode) and positive (anode) electrodes, respectively, which typically are metal plates positioned in a selected electrolyte. The hydrogen and oxygen thus produced may be captured and used as desired, or may be discarded, depending on the particular application. Many different electrolysis systems are known. Typically, the electrodes are at a different potential, resulting in a DC current between the two electrodes and hence an electric current output from the cell.

In some applications, an external current is applied to the electrodes. One example of such an apparatus, which includes the use of a pulsed DC current, is shown in U.S. Pat. No. 3,980,053 to Horvath. Horvath's pulsed DC signal, however, is characterized by a high frequency and a high current. The apparatus is inefficient, and could be quite dangerous in actual operation. The object of the Horvath apparatus is the production of both hydrogen and oxygen. The electrode which produces the oxygen is maintained in a state of passivation.

The inexpensive, safe production of hydrogen is becoming increasingly desirable because hydrogen, in addition to other light hydrocarbon gases such as propane and butane, is becoming more popular as an inexpensive and clean burning source of energy. Efficiency is thus an important issue in the production of hydrogen, although most existing systems for producing hydrogen, particularly systems which operate on a relatively small scale, are quite inefficient as well as expensive. Further, such systems are often difficult to adequately monitor to maintain safety. These disadvantages, in addition to others, have resulted in a lack of emphasis and subsequent success in the commercial production of hydrogen with electrolysis technology.

In a somewhat related technological area, there is also a continuing need for inexpensive and reliable methods for removing oxides or scale or other film or coating of inorganic compounds from metal plates, as well as a need for methods of polishing or otherwise preparing the surfaces of metal plates in some fashion for plating and the like. Metal plates typically develop oxide coatings or other electrically nonconductive films in use. In automobile batteries, for instance, the lead plates can become covered with an excessive amount of lead sulfate, to the point where the battery will cease operation. This is often referred to as a state of passivation, in which the electrodes become in effect "passive", i.e. no current flows between the plates.

Another common example of a metal oxide coating is the film of rust which covers steel plates, a condition which is undesirable in many applications. Known methods of removing such non-conductive coatings are usually somewhat cumbersome and fairly expensive. Therefore, there is a need for a reliable method of removing such coatings which is both efficient and relatively inexpensive.

Besides the removal of oxides and other coatings per se, there are other related situations involving metal plates in which the surfaces thereof must be prepared in a particular way prior to use and/or further treatment. Electropolishing and pickling are but two examples of such surface preparation. Pickling, for instance, refers to a process for thoroughly cleaning a metal surface, particularly steel, but other metals as well. It usually involves the dissolution of the existing oxide film or scale on the steel with mineral acids such as sulfuric, nitric, hydrochloric or hydrofluoric acids.

Another somewhat related problem dealing with metal surfaces is the protection of metal surfaces from oxidation or other deterioration through electrolysis. This is generally referred to as cathodic protection and includes the protection of pipelines and hulls of vessels.

DISCLOSURE OF THE INVENTION

Accordingly, the present invention, in one aspect, includes a method and apparatus for electrically conditioning electrode means positioned in an electrolyte. The electrode means includes at least one metal electrode which includes cathodic and anodic portions. A pulsating DC voltage is generated and applied to the electrode means. The signal has particular characteristics with values selected such that hydrogen is produced at the cathodic portion of the electrode means and further such that the anodic portion of said electrode means is maintained substantially in a state of depassivation.

In another aspect, at least one of the portions of the electrode means has a coating thereon, such as an oxide or other inorganic film or other scale, and the particular characteristics of the signal are selected such that the coating is removed from the one portion upon application of such signal to the electrode means. Further, in such a method, the one portion of the electrode means is thereafter maintained in a state of depassivation.

BRIEF DESCRIPTION OF THE DRAWINGS

FIG. 1 is a simplified schematic representation of the combination of the electrode conditioning system of the present invention and an electrolysis cell.

FIG. 2 is a simplified diagram of an electrolysis cell and related chamber for storing hydrogen.

FIG. 3 is an electrical schematic of the electrode conditioning system of the present invention.

FIG. 4 is a graph showing production of hydrogen against time for one embodiment of the present invention using the circuit of FIG. 3 and using aluminum electrodes in the electrolysis cell.

FIG. 5 is a graph showing the production of hydrogen against time for another embodiment of the present invention using the circuit of FIG. 3 and using steel electrodes in the electrolysis cell.

FIG. 6 is a graph showing output voltage against time for the embodiment graphed in FIG. 4.

FIG. 10 is a table showing results of tests conducted on one embodiment of the system of the present invention using the circuit of FIG. 3 and both aluminum and steel electrodes, respectively, in the electrolysis cell.

BEST MODE FOR CARRYING OUT THE INVENTION

Figure 7:
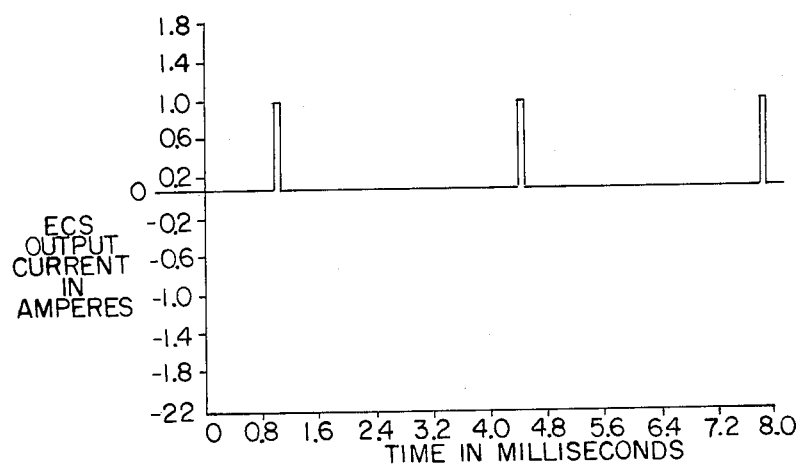
FIG. 7 is a graph showing output current against time for the embodiment graphed in FIG. 4.

Referring to FIGS. 1 and 2, the electrode conditioning system of the present invention is shown in a simplified form in relation to an electrolysis cell and a chamber for collecting hydrogen produced during operation of the system. The electrode conditioning circuit, shown as block 10 in FIG. 1, operates from a source of AC power 12. The output of the electrode conditioning circuit 10, at lines 14 and 16, is a pulsed DC current. Line 14 is connected to a first set of plates 17 in an electrolysis cell which is generally shown at 18. Line 16 is connected to the other set of plates 20. In the embodiment shown, plates 17 comprise the cathode and plates 20 comprise the anode.

In the embodiment shown, the plates 17 and 20 are four aluminum or steel rectangular plates approximately 4.3 centimeters wide, 0.1 centimeters thick and 15 centimeters long, mounted vertically within an electrolyte 28 such that approximately 13.5 centimeters of each plate is submerged. The plates are 1.1 centimeters apart. The two plates 17—17 comprising the cathode are connected in parallel by lead 24 while the two other plates 20—20 comprising the anode are connected in parallel by lead 26. The electrolyte 28 in which the plates are mounted is basically saltwater; in particular, approximately 36 grams of table salt dissolved in 1600 milliliters of tap water in the embodiment shown.

Also in the circuit shown in FIG. 1 are a resistor 30 and an ampmeter 32. The resistor is for balancing the circuit, if necessary, and the ampmeter is to show the amount of current in the circuit. Neither of those elements, however, are essential to the invention.

Extending from the electrolysis cell 18, as shown in FIG. 2, is a pipe 34 which is connected to a cylinder 36 or other container. Cylinder 36 is completely filled with water. Hydrogen gas which is produced by the process described below exits from the electrolysis cell 18 through pipe 34 and is stored in cylinder 36.

It should be understood that the electrolysis cell portion of the system described herein as well as the apparatus for storing the hydrogen gas produced are relatively conventional and that other structural arrangements and configurations could be used. It should be further understood that the electrolysis cell could be virtually any size, including considerably larger than that described herein. The configuration of the electrolysis cell in the embodiment shown is for purposes of illustration only.

The electrode conditioning circuit shown in block 10 is connected to terminals 27, 29 of the cell shown in FIG. 2 to produce the desired results. When switches 31a, 31b are closed and switches 33a, 33b are open, one terminal is positive and the other is negative. When switches 31a, 31b are open and switches 33a, 33b are closed, the opposite is true, so that the plates 17—17 and 20—20 could serve, respectively, as either the cathode or the anode in the electrolysis cell. Also, the electrolysis cell could be arranged so that opposite sides of a single plate could serve as cathode and anode, respectively, i.e. bipolar electrodes.

The electrode conditioning circuit 10 is shown in more detail in FIG. 3. 120 volts AC power is provided to the primary winding 38 of a center tapped transformer 40. A switch 42 controls the on-off operation of circuit 10 and a neon bulb 44 shows the operating condition. A slow-blow fuse 45 provides protection for circuit 10.

The output of secondary 46 of transformer 40 is a 25 volt AC signal, which is full wave rectified by diodes 49 and 50, resulting in a pulsating DC signal of 18 volts peak. This pulsating DC signal is smoothed out by capacitor 52 which in the embodiment shown is fairly large, on the order of 0.037 farads. This signal is applied as an input to a voltage regulator comprising an operational amplifier 54 and associated feedback capacitor 56. The output of the voltage regulator is a stable 12 volt DC signal on line 58.

Timing circuit 60, to which the signal on line 53 is applied, generally comprises two timer circuits in a single integrated circuit chip. In the embodiment shown, it is an NE/SE556 manufactured by Intercell Corporation, or equivalent, such as TLC 556 from Radio Shack. The output of the first timer circuit, in response to the input signal at pin 14, is a square wave, the relative timing of the square wave being determined by a series RC circuit comprising adjustable resistor 62 and capacitor 64. The square wave signal, at pin 5, in turn is shaped by a parallel RC circuit comprising adjustable resistor 66 and capacitor 68 to produce a relatively short voltage spike at each point in time when the square wave from the timer 60 at pin 5 goes positive.

The voltage spike is used to control transistor 70 which, with resistor 72, forms a one-shot multivibrator which in turn, when triggered, produces an output pulse of selected duration. The width of this pulse is established by the values of adjustable resistor 74, resistor 76 and capacitor 78. In the embodiment shown, resistor 76 is 220 ohms and capacitor 78 is 0.7 microfarads. The train of pulses from capacitor 70 is applied to transistor 84 which in turn controls output transistor 86.

Transistor 86 operates as an output current switch. When transistor 85 is on, a DC output of selected magnitude appears between outputs 88 and 90. Transistor 86 is controlled such that the output is a pulsed DC signal having a selected pulse repetition rate and pulse width. Resistor 92 and meter 94 are connected so as to provide a direct indication of the average current supplied to the electrolysis cell.

Output points 88 and 90 are connected to an electrolysis cell, as shown in FIGS. 1 and 2. The peak voltage, pulse repetition rate, pulse width and the duty cycle of the DC pulse signal at outputs 88 and 90 may be varied by adjusting the various elements discussed above. In the embodiment shown, one or more of these signal characteristics, particularly peak voltage and duty cycle, are controlled, as explained in more detail below, so that application of the signal to given electrodes in a given electrolyte will result in the production of hydrogen at one electrode and the continuing depassivation of the other electrode.

In the process of depassivation, oxides and other surface coverings, such as a coating of inorganic material or specific debris such as rust or other scale, are removed from the surface, and the bare metal underneath comprising the electrode is maintained substantially in an exposed state, so that the electrode continues to discharge between successive pulses. The surface of the electrode thus "dissolves", or "corrodes" instead of being stable. Typically, relatively little, of any, oxygen is produced at the depassivated electrode, so that the electrode does not have the opportunity to "heal itself" through the formation of a surface oxide. Such action permits the use of the present invention in metal surface cleaning applications, such as surface polishing or pickling of steel or other metals. These features are discussed in more detail below, as well as the high energy and current efficiencies possible with the present invention, because of the volume of hydrogen produced with relatively low current input.

FIGS. 4, 6 and 7 are graphs showing the results obtained from a conbination comprising the electrolysis cell and the electrode conditioning system described above, using aluminum electrodes in the electrolysis cell. FIG. 5 shows generally the production of hydrogen over time with respect to the electrode conditioning circuit of FIG. 3, while the signal output (voltage and current against time) to the electrolysis cell is shown in FIGS. 6 and 7.

Referring to FIG. 6 in particular, the circuit of FIG. 3 is arranged to produce a voltage pulse of approximately 0.7 volts peak with pulse width of 0.075 milliseconds. The time between successive pulses is 3.39 milliseconds, resulting in a duty cycle of approximately 0.02. The corresponding signal current levels are shown in FIG. 7.

Operationally, in response to the electrical signal of FIG. 6, one set of aluminum plates is polarized as the cathode, and the other is polarized as the anode, resulting in the production of a form of aluminum oxide, such as $Al_2O_3$ or $Al[OH]_3$ at the anode and hydrogen at the cathode. During the interval between successive electrical pulses from the circuit of FIG. 3, the reaction of the electrodes in the electrolysis cell continues without external electrical power being applied.

The production of hydrogen and aluminum hydroxide during the interval between externally applied electrical pulses is referred to as electrolysis discharge, i.e. the electrodes are in fact "discharging". Repolarization refers to that interval of time during which the electrical pulses are applied to the electrodes, i.e. at intervals of 3.39 milliseconds in FIG. 6.

It has been found, as pointed out above, that the DC pulse pattern shown in FIG. 6 prevents the passivation of the aluminum electrodes and assures the continuing electrolysis discharge of the cell. The surface of the electrodes is maintained essentially bare, and relatively little, if any, oxygen is produced.

The peak voltage of FIG. 6 is in the embodiment shown sufficient to produce $Al[OH]_3$. This value of peak voltage appears to be a minimum driving voltage to sustain the reaction for aluminum electrodes. At a sufficiently higher peak voltage, different aluminum oxides or hydroxides or even oxygen will be produced, which may be desirable in particular applications. However, it is advantageous in many applications to maintain the voltage and current levels relatively low so as to maximize energy efficiently and not produce oxygen.

The reaction at the anode in the embodiment shown is $2Al - 6e^- \rightarrow 2Al^+$, while at the cathode the reaction is $6H^+ + 6e^- \rightarrow 3H_2$. The overall reaction is $2Al + 6H_2O \rightarrow 2Al[OH]_3 + 3H_2$. In this embodiment, it can thus be seen that relatively small amounts, if any, of oxygen are produced. Besides other advantages dealing with cleaning and depassivation, as discussed above, this increases the inherent safety of the apparatus. Oxygen could be produced, if desired, by increasing the driving voltage to required known levels.

Figure 8:
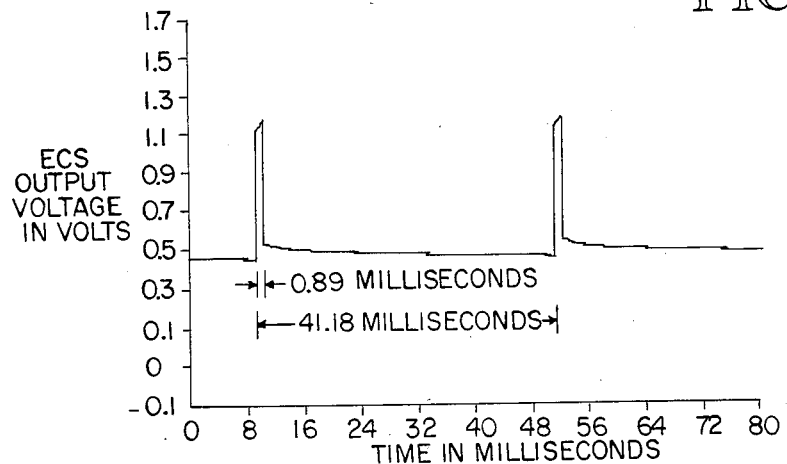
FIG. 8 is a graph showing output voltage against time for the embodiment graphed in FIG. 5.
Figure 9:
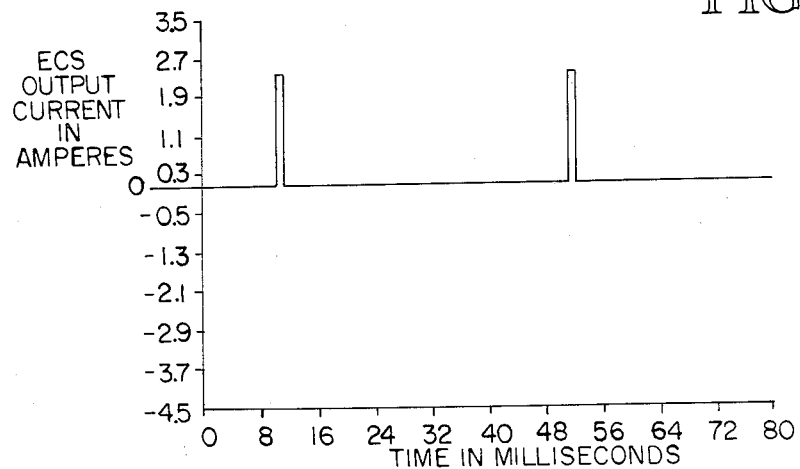
FIG. 9 is a graph showing output current against time for the embodiment graphed in FIG. 5.

Similar graph information is provided for conventional high quality steel electrodes, in FIGS. 5, 8 and 9. FIG. 5 shows production of hydrogen vs. time for the voltage conditioning signal shown in FIGS. 8 and 9. Referring to FIG. 8 in particular, the peak voltage of the pulses is 1.2 volts, which is somewhat greater than the peak voltage for the aluminum electrode embodiment. The pulse width, at 0.89 milliseconds, is substantially wider than for the aluminum electrode embodiment, although the duty cycle of the signal is approximately the same. The peak current of the pulses is also greater, approximately 2.5 amps as opposed to 1.0 amps. The energy efficiency, however, is still up to 100% and even greater.

The reaction at the anode is $Fe - 2e^- \rightarrow Fe^{2+}$, while the reaction at the cathode is $2H^+ + 2e^- \rightarrow H_2$. The overall reaction is $Fe + 2H_2O \rightarrow Fe(OH)_2 + H_2$. Again, very little oxygen is produced at the stated peak voltage levels. However, higher peak voltages will result in production of $Fe[OH]_3$ and at still higher levels, $O_2$ will be produced.

The present invention has very high energy and current efficiencies. FIG. 10 is a table which shows a representative sample of results of tests on the combination of the electrolysis cell and the electrode conditioning system of FIG. 3, with the output signal being in accordance with FIGS. 6–9. FIG. 10 also shows corresponding calculations for energy efficiency and current efficiency, using the obtained values for current and voltage.

The known formula for current efficiency (CE), in percent, relative to hydrogen production is:

$$CE = \frac{8.616 \, H(60)(100)}{I_{av}(3600)(5)}$$

$$= \frac{14.36 \, H}{I_{av}(t)}$$

where H is in milliliters for a particular time interval (t) in minutes and $I_{av}$ is in amperes. Further, from Perry's Chemical Engineering Handbook, it is known that 325 BTU/cuft is the maximum fuel value of hydrogen. This is equivalent to 0.00336 watt hr/ml of hydrogen. Thus, energy efficiency (EE), in percent, is:

$$EE = \frac{0.00336 \, H(60)(100)}{I_{av}(Vpk)(t)}$$

$$= \frac{20.16 \, H}{I_{av}(Vpk)(t)}$$

As shown in FIG. 10, energy efficiencies for the present invention can be 100% or even much higher in particular circumstances. Other circuit configurations, using other metals as electrodes and other electrolysis cell configurations, may have somewhat different efficiencies.

In the above-identified embodiments, one primary purpose is to produce high quality hydrogen at a high energy efficiency and in a relatively safe manner. These embodiments have applications which include, among others, a portable fuel cell, in which hydrogen gas is the energy source, or as a means for producing hydrogen directly at a remote site, which eliminates the need to transport hydrogen to the site.

In addition to the production of hydrogen, the invention can be used as a relatively low cost means of producing different metal hydroxides or oxides, such as aluminum hydroxide, depending upon the metal used for the electrodes. Such hydroxides/oxides have a number of different commercial uses.

In other applications involving the present invention, energy or current efficiency per se may not be the most important factor. For instance, in applications involving surface treatment of metals, including specifically the removal of metal oxides or inorganic compound or other scale or debris, such as rust, from plates, or in pickling steel or other metal, or in the reconditioning of batteries by removing lead sulfate from the plates, or in metal depleting, or in electropolishing or etching to clean and prepare a metal surface, especially for further treatment, such as plating, factors other than high energy efficiency are quite important. The principles of the present invention can be used to provide a fast, inexpensive and convenient means to accomplish the above functions. This is done by adjusting the one or more characteristics of the signal, i.e. the duty cycle, peak voltage, and pulse repetition rate to suit the particular application. With respect to the duty cycle, for instance, a normal range of adjustment would be between somewhat below 2% to 10%, with the higher duty cycle resulting in lower efficiencies. However, in certain applications, such as pickling steel and reconditioning lead-acid batteries, the duty cycle will typically be higher, i.e. 35%, with a possible range of 30%–40%.

Still further, the principles of the present invention can be used to provide cathodic protection for pipelines and boats, by adjusting the current to a level sufficient to stop or significantly reduce corrosion of the cathodic element.

Although a preferred embodiment of the present invention has been disclosed herein for illustration, it should be understood that various changes, modifications and substitutions may be incorporated in such embodiment without departing from the spirit of the invention as defined by the claims which follow.

I claim:

1. An apparatus for electrically conditioning electrodes which are positioned in an electrolyte, comprising:
   electrode means, including at least one metal electrode, wherein the electrode means is positioned in an electrolyte and includes cathodic and anodic portions;
   means for generating a pulsating DC voltage signal, wherein particular characteristics of the signal have values selected such that when the pulsating DC voltage signal is applied to the electrode means, hydrogen is produced off the cathodic portion of said electrode means and such that the anodic portion of said electrode means is maintained substantially in a state of depassivation wherein substantially no oxygen is produced off the anodic portion and the anodic portion is consumed in operation of the apparatus; and
   means connecting the DC voltage signal to said electrode means.

2. An apparatus of claim 1, wherein said particular characteristics of the signal include at least the peak pulse voltage and the duty cycle of the signal.

3. An apparatus of claim 2, wherein said particular characteristics of the signal include the pulse repetition rate.

4. An apparatus of claim 2, wherein said particular characteristics are such that an energy efficiency approaching at least 100% is obtained.

5. An apparatus of claim 1, wherein the cathodic and anodic portions of said electrode means comprise separate sections of said one metal electrode.

6. An apparatus of claim 1, wherein the electrode means includes at least two metal plates, one plate being the cathode portion and the other plate being the anode portion.

7. An apparatus of claim 1, including switching means to selectively reverse the polarity of the pulsating DC voltage signal.

8. An apparatus of claim 1, wherein said signal generating means includes means for producing a series of square wave pulses, means for controlling the pulse duration and pulse repetiton rate of said square wave pulses, and means using said square wave pulses to control the connection of a source of DC voltage of selected magnitude to the electrode means.

9. An apparatus of claim 8, including means for varying the peak voltage, the duty cycle and the pulse repetition rate of said pulsating DC voltage signal.

10. An apparatus for electrically conditioning an electrode means which includes at least one metal electrode, the electrode means being positioned in an electrolyte and including cathodic and anodic portions, at least one of the portions having a coating on at least a part thereof such as an oxide or other inorganic film, the apparatus comprising:
    means for generating a pulsating DC voltage signal, wherein particular characteristics of the signal have values selected such that when the pulsating DC voltage signal is applied to the electrode means, hydrogen is produced off the cathodic portion of the electrode means and substantially no oxygen is produced off the anodic portion;
    means for selectively reversing the polarity of the pulsating DC voltage signal; and
    means connecting the pulsating DC voltage signal to the electrode means, such that the coating is substantially removed from the one portion thereof in the absence of oxygen.

11. An apparatus of claim 10, wherein said particular characteristics include at least peak pulse voltage and the duty cycle of the signal.

12. An apparatus of claim 10, wherein the electrode means is a recently manufactured sheet of metal, such as steel, and wherein said particular characteristics of the signal are such as to accomplish substantially acid-free pickling of the metal sheet.

13. An apparatus of claim 10, wherein the electrode means are lead plates from a lead-acid battery and the coating is lead sulfate, and wherein said particular characteristics of the signal have such values that the lead sulfate coating is removed from the electrode means and the electrode means depassivated.

14. A method for electrically conditioning electrodes, wherein the electrodes are positioned in an electrolyte, and include a cathode and an anode, the method comprising the steps of:
    generating a pulsating DC voltage signal having particular characteristics with selected values such that, when the pulsating DC voltage signal is applied to said electrodes, hydrogen is produced off the cathode and such that the anode is maintained substantially in a state of depassivation wherein substantially no oxygen is produced off the anode and the anode is consumed.

15. A method of claim 14, wherein said particular characteristics of the signal include at least the peak pulse voltage and the duty cycle of the signal.

16. A method of claim 15, wherein said particular characteristics are such that an energy efficiency approaching at least 100 percent is obtained.

17. A method for electrically conditioning electrodes which are positioned in an electrolyte and include a cathode and an anode, wherein at least one of the electrodes has a coating on at least a part thereof such as oxide, other inorganic film, or other scale or film, the method comprising the steps of:

generating a pulsating DC voltage signal having particular characteristics with selected values such that when the pulsating DC voltage signal is applied to the electrodes, hydrogen is produced off the cathode and substantially no oxygen is produced off the anode;

selectively reversing the polarity of the pulsating DC voltage signal; and applying the selectively reversible pulsating DC voltage signal to the electrodes, such that the coating on the one electrode is substantially removed therefrom in the absence of oxygen.

18. A method of claim 17, wherein the particular characteristics include at least peak pulse voltage and the duty cycle of the signal.

19. A method of claim 17, wherein the electrode is a recently manufactured metal sheet, such as steel and wherein said particular characteristics are such as to accomplish substantially acid-free pickling of the metal sheet.

20. A method of claim 17, wherein the electrode is lead plate from a lead-acid battery and the coating is lead sulfate, and wherein said particular characteristics of the signal have such values that the lead sulfate coating is removed from the electrode and the electrode depassivated.

* * * * *